United States Patent [19]

Matsuda et al.

[11] Patent Number: 5,569,114
[45] Date of Patent: Oct. 29, 1996

[54] PULLEY THRUST PRESSURE CONTROL APPARATUS FOR BELT-TYPE CONTINUOUSLY VARIABLE TRANSMISSION

[75] Inventors: Takahiro Matsuda, Hiki-gun; Daihei Teshima, Asaka, both of Japan

[73] Assignee: Honda Giken Kogyo Kabushiki Kaisha, Tokyo, Japan

[21] Appl. No.: 219,591

[22] Filed: Mar. 29, 1994

[30] Foreign Application Priority Data

Mar. 31, 1993 [JP] Japan .................................. 5-096811

[51] Int. Cl.$^6$ ...................................................... F16H 9/00
[52] U.S. Cl. ............................................... 477/45; 477/48
[58] Field of Search ................................ 477/45, 46, 48, 477/47; 474/12, 23, 17, 28

[56] References Cited

U.S. PATENT DOCUMENTS

| | | | |
|---|---|---|---|
| 4,403,975 | 9/1983 | Rattunde | 474/18 |
| 4,475,416 | 10/1984 | Underwood | 477/45 X |
| 4,515,040 | 5/1985 | Takeuchi et al. | 477/48 X |
| 4,534,243 | 8/1985 | Yokoyama et al. | 477/45 |
| 4,669,336 | 6/1987 | Okada et al. | 477/48 X |
| 4,716,791 | 1/1988 | Ohzono et al. | 477/45 |
| 4,771,658 | 9/1988 | Miyawaki | 477/45 X |
| 4,857,034 | 8/1989 | Kouno et al. | 474/28 |
| 5,042,325 | 8/1991 | Sawasaki et al. | 477/45 |
| 5,069,083 | 12/1991 | Hirano et al. | 477/45 X |
| 5,176,579 | 1/1993 | Ohsono et al. | 474/1 |
| 5,183,439 | 2/1993 | Yumoto et al. | 474/28 |
| 5,259,272 | 11/1993 | Yamamoto et al. | 477/45 |

FOREIGN PATENT DOCUMENTS

| | | |
|---|---|---|
| 63-222943 | 8/1988 | Japan . |
| 245062 | 7/1990 | Japan . |
| 338517 | 1/1991 | Japan . |

OTHER PUBLICATIONS

English Language Abstract of JP 2-45062.
English Language Abstract of JP 63-222943.

*Primary Examiner*—Khoi Q. Ta
*Attorney, Agent, or Firm*—Lyon & Lyon

[57] ABSTRACT

A pulley thrust pressure control apparatus for a belt-type continuously variable transmission having a drive pulley connected with an input member, a driven pulley connected with an output member, a V-belt trained around the drive and driven pulleys, a drive cylinder for varying the pulley width of the drive pulley, and a driven cylinder for varying the pulley width of the driven pulley. The actual transmitting torque transmitted through the V-belt is calculated and a belt transmittable torque is calculated by multiplying the actual transmitting torque by a safety factor which is higher when said actual transmitting torque is negative than when it is positive. A pulley thrust pressure control valve controls the pressures supplied to the drive and driven cylinders so as to obtain the calculated belt transmitting torque.

20 Claims, 9 Drawing Sheets

PULLEY THRUST PRESSURE CONTROL APPARATUS FOR BELT-TYPE CONTINUOUSLY VARIABLE TRANSMISSION

BACKGROUND OF THE INVENTION

1. Field of the Invention

The present invent ion relates to a control apparatus for controlling the pulley thrust control pressure which produces a thrust force to axially squeeze the belt between the sides of the pulley so as to adjust the allowable transmitting torque through the belt.

2. Relating Prior Arts

Belt-type continuously variable transmissions are previously well-known and have been put to practical use on automobiles and other vehicles. The belt-type continuously variable transmission comprises, for example, drive and driven pulleys each having a variable pulley width and a metallic V-belt trained around the drive and driven pulleys. The speed ratio thereof is controlled by controlling the pulley widths of the drive and driven pulleys. The drive and driven pulleys respectively have drive and driven hydraulic cylinders for applying axial thrust forces fending to reduce the widths of the drive and driven pulleys, respectively, which forces are produced by a pulley thrust hydraulic pressure supplied to the cylinders. The control of the pulley thrust pressures to the respective cylinders causes variations in the width of each pulley to vary the diameters of circles around which the V-belt is trained on the pulleys for controlling the speed ratio of the transmission.

The pulley thrust pressure for controlling the speed ratio is determined based on the torque transmitted through the V-belt. The torque transmission that is capable of being transmitted through the V-belt is a function of the friction between the V-belt and the pulleys. The pulley thrust pressure is so set that the transmittable torque through the V-belt, which is determined based on the friction between the V-belt and the pulleys, is larger than the actual transmitting torque through the V-belt by a certain amount. Therefore, slippages between the V-belt and the pulleys can be positively avoided to improve the transmitting efficiency.

While it is preferable to make the transmittable torque produced by the pulley thrust pressure larger than the actual transmitting torque so as to positively prevent the slippage of the V-belt, if the pulley thrust pressure is excessively high, the driving power required for the oil pump which supplies hydraulic oil for producing the pulley thrust pressure becomes excessively large to deteriorate the fuel economy of the engine driving the pump. Also, under an excessively high pulley thrust pressure, the life or durability of the V-belt may be decreased.

Accordingly, it is preferable to make the pulley thrust pressure as low as possible within an allowable range in which the slippage of the V-belt can be prevented. Several preferable methods of setting the pulley thrust pressure have previously been proposed.

One method is disclosed in Japanese Patent Publication No. 2-45062. That method comprises the steps of; calculating the engine output power based on the engine speed and the engine intake vacuum pressure, calculating a speed reduction ratio (or a speed ratio) of the transmission based on the engine speed and a driven pulley speed, and determining an optimum pulley thrust pressure based on the engine output power and the speed reduction ratio. Another method is disclosed in Japanese Patent Laid-open Publication No. 63-222943, which method comprises the steps of; calculating an engine output torque, correcting the engine output torque by subtracting the power loss inherent in the drive mechanism, and determining a pulley thrust pressure based on the corrected engine output torque. A further method is disclosed in Japanese Utility-Model Publication No. 3-38517, which method comprises the steps of; calculating an engine output torque, correcting the engine output torque by subtracting or adding an inertia torque which is produced when the pulley is accelerated or decelerated, and determining the pulley thrust pressure based on the corrected engine output torque.

The above methods can improve the pulley thrust force control. However, all of the above prior art methods are used even when the actual transmitting torque to the drive pulley is negative (that is, when an engine braking is being applied through the transmission) as well as when it is positive (that is, when the drive pulley is driven by the engine).

When the actual transmitting torque is positive, it can be accurately calculated based on the engine operating conditions. However, when the actual transmitting torque is negative, the deviation thereof is fairly large and it is difficult to accurately calculate such torque.

Therefore, in order to avoid any slippage of the V-belt even when the actual transmitting torque is negative, the pulley thrust pressure should be set at a magnitude high enough to produce a fairly high transmittable torque even under a negative transmitting torque. However, as described above, the high pulley thrust pressure may deteriorate the engine fuel economy and the V-belt life.

Moreover, continuously variable transmissions often have a starting clutch and a directional control clutch (that is, a forward-reverse clutch) that presents additional control problems. When a shift range position set by a manual shift lever is N (neutral) or P (parking) position, the clutches are released and no power is transmitted through the transmission. The above-mentioned prior methods are not suitable for the conditions when the shift range position is at N or P-position.

In order to use the above prior art methods satisfactorily under such conditions, a different control must be conducted only when the shift position is N or P. For this control, a shift position detector is necessary to detect the shift position of the transmission. A conventional position detector which is usually used with an automatic transmission to detect manual shift lever positions is often used. However, when the manual shift lever is shifted from a D-position to a L-position for example, the detection signal from the detector is changed from a D-position signal to a L-position signal through OFF-range. No signal is sent from the detector in the OFF-range. If the shift lever is accidentally held at a position between the D and L-positions (at OFF-range position), the pulley thrust pressure control may be lost or the pressure may be reduced to zero. Then the V-belt may slip to deteriorate the transmitting efficiency and the duration of the V-belt.

In overcoming the deficiencies of the prior art control methods, the present inventors have accounted for certain facts and features of this type of V-belt drive. The pulley thrust pressure is also used to control the speed ratio. To increase the speed ratio (that is, to shift to the LOW ratio), the pulley thrust pressure in the drive pulley is set to be lower than in the driven pulley to cause the effective diameter of the drive pulley to decrease and the driven pulley to increase. To decrease the speed ratio (that is, to shift to the TOP ratio), the pulley thrust pressure in the driven pulley is set to be lower than in the drive pulley to decrease the effective diameter of the driven pulley and increase the effective diameter of the drive pulley. In other words, when shifted toward LOW, the thrust pressure in the drive pulley is low and the thrust pressure in the driven pulley is high. When shifted toward TOP, the thrust pressure in the driven pulley is low and the pressure in the drive pulley is high.

It is necessary to prevent any slippage both in the drive and driven pulleys. Because slippage is more likely to occur at the pulley on which the low pulley thrust pressure is being applied, the low pulley thrust pressure is set at a level that is adequate to prevent the slippage. Therefore, the low pulley thrust pressure is determined based on the engine output torque so that the transmittable torque through the belt is higher than the actual transmitting torque by a certain amount.

The actual transmitting torque in the drive pulley is equal to the engine output torque, when it is positive. But the actual transmitting torque in the driven pulley is less than the engine output torque because of the friction loss inherent in the V-belt drive. Therefore, when the pulley thrust pressure in the driven pulley is low and is determined based on the engine output torque, the pulley thrust pressure in the driven pulley tends to be unnecessary high (by an amount corresponding to the friction loss of the V-belt).

SUMMARY OF THE INVENTION

It is an object of the invention to provide a pulley thrust pressure control apparatus for a belt-type continuously variable transmission to appropriately control the pulley thrust pressure even when the actual transmitting torque through the belt is negative as well as when it is positive.

It is an another object of the invention to provide a pulley thrust pressure control apparatus to appropriately control the pulley thrust pressure even when a clutch in the transmission is released.

It is a further object of the invention to provide a pulley thrust pressure control apparatus to appropriately control the pulley thrust pressure to prevent slippage of the belt even when no signal is sent from a shift position detector.

It is a still further object of the invention to provide a pulley thrust pressure control apparatus to appropriately control the pulley thrust pressure to prevent slippage of the belt considering the friction loss of the belt.

In order to achieve the objects of this invention, the pulley thrust pressure control apparatus is used for a belt-type continuously variable transmission having a drive pulley, a driven pulley, a V-belt trained around the drive and driven pulleys, and drive and driven cylinders for varying pulley widths. The apparatus comprises an actual transmitting torque calculation means for calculating an actual transmitting torque transmitted through the V-belt, a belt transmittable torque calculation means for calculating a belt transmittable torque by multiplying the actual transmitting torque by a safety factor, and a pulley thrust pressure control valve for controlling pulley thrust pressures supplied to the drive and driven cylinders so as to obtain the belt transmitting torque. The safety factor is set so as to be higher when the actual transmitting torque is negative than when the actual transmitting torque is positive.

By this invention, it is recognized that when the actual transmitting torque is positive, it can be accurately calculated and, accordingly, a small safety factor can be used in the apparatus to improve the fuel economy and the duration of the V-belt. However, when the actual transmitting torque is negative, the deviation thereof is fairly large and accordingly, a large (or high) safety factor is used to positively prohibit slippage of the V-belt. Further, when the actual transmitting torque is negative, no fuel is being supplied to the engine and therefore the fuel economy is not deteriorated.

Because the belt-type continuously variable transmission may have a clutch for connecting and disconnecting a power transmission path between the engine and the drive pulley, the control apparatus of this invention may comprise a belt transmittable torque calculation means for calculating a belt transmittable torque through the V-belt, and a pulley thrust pressure control valve for controlling pulley thrust pressures supplied to the drive and driven cylinders based on the belt transmittable torque. The belt transmittable torque is calculated by the belt transmittable torque calculation means based on a drive torque from the engine when the power transmission path is connected by the clutch but the belt transmittable torque is calculated by the belt transmittable torque calculation means based, at least in part, on an inertia torque in the drive pulley side inertia mass when the power transmission path is disconnected by the clutch. Specifically, when the power transmission path is disconnected by the clutch and the pressure in the drive cylinder is lower than the pressure in the driven cylinder, the belt transmittable torque is calculated based on only the inertia torque in the drive pulley side inertia mass. However, the belt transmittable torque is calculated based on both the inertia torque in the drive cylinder side inertia mass and the belt drive friction torque when the pressure in the driven cylinder is lower than the pressure in the drive cylinder.

The control apparatus of this invention may further include a shift position detecting means for detecting a present shift position. In such apparatus, the belt transmittable torque is calculated by the belt transmittable torque calculation means based on the torque transmitted from the drive power source when it is detected by the shift position detecting means that one of the driving shift positions, such as D- or L-position, is selected. The belt transmittable torque is also calculated based on the torque transmitted from the drive power source even when no detection signal is sent from the shift position detecting means. The belt transmittable torque is calculated based on the inertia torque in the drive pulley side inertia mass when it is detected by the shift position detecting means that a neutral (N-) position is selected.

The control apparatus of this invention may have a shift control valve for supplying a pressure to and discharging a pressure from the drive and driven cylinders, a belt transmittable torque calculation means for calculating a belt transmittable torque through the V-belt based on the engine output torque and the speed ratio, and a transmittable torque correction means for correcting the belt transmittable torque based on the belt drive friction torque in the V-belt when it is decided that the pressure is discharged from the driven cylinder by the shift control valve. The shift control valve is controlled so as to obtain the corrected belt transmittable torque.

DESCRIPTION OF THE PREFERRED EMBODIMENTS

Figure 1:
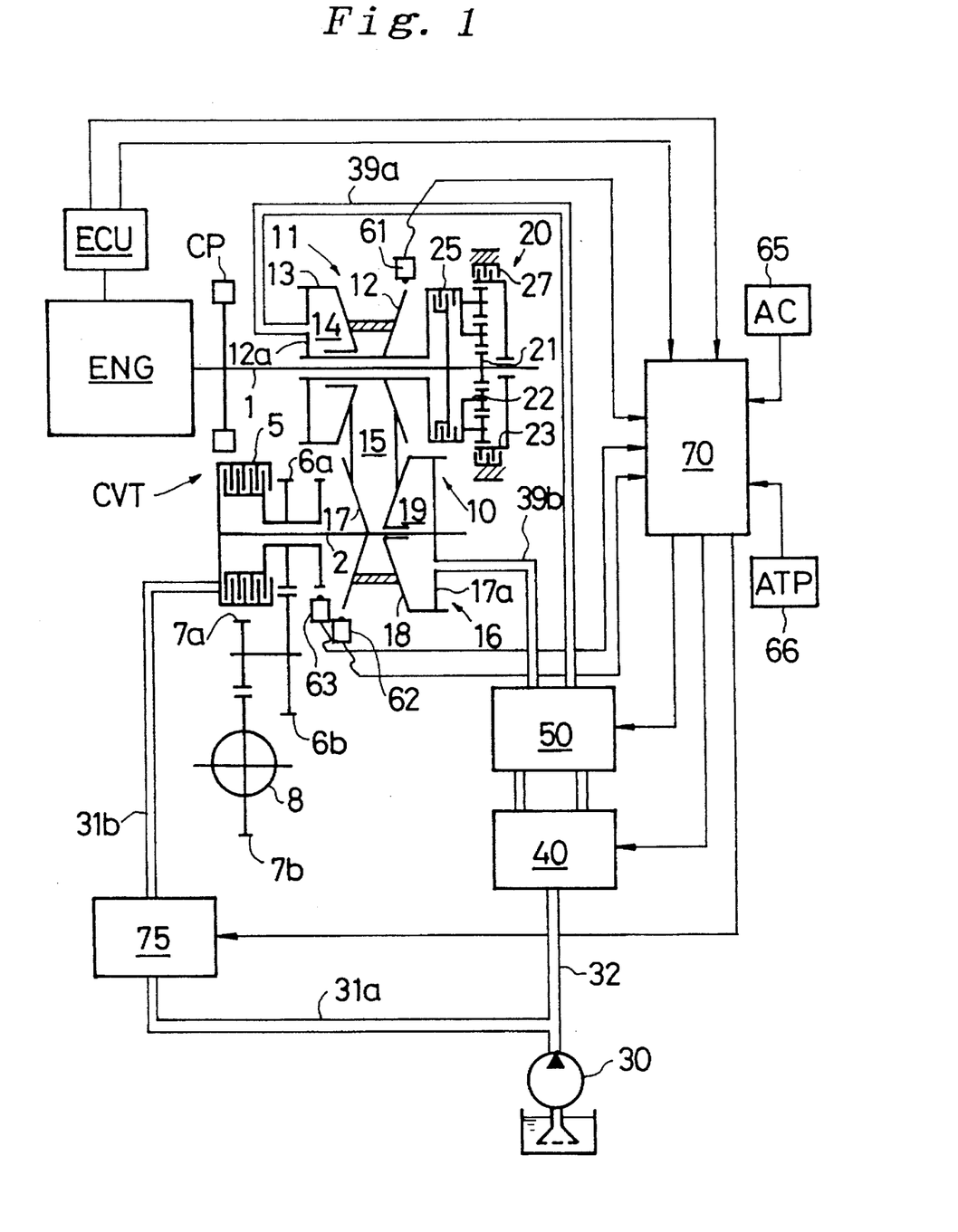
FIG. 1 is a schematic view showing in skeleton form a V-belt-type continuously variable transmission having a pulley thrust pressure control apparatus according to the present invention.

A belt-type continuously variable transmission having a control apparatus according to the present invention is schematically shown in FIG. 1. The belt-type continuously variable transmission CVT comprises a metallic V-belt mechanism 10 disposed between an input shaft 1 and a counter shaft 2, a planetary-gear forward-reverse selector mechanism 20 disposed between the input shaft 1 and a drive pulley 11, and a starting clutch 5 disposed between the counter shaft 2 and an output member (a differential mechanism 8, for example). The transmission CVT is suitable for use as a motor vehicle transmission. The input shaft 1 is connected with an engine output shaft of an engine ENG through a coupling mechanism CP. The differential mechanism 8 is connected with right and left wheels (not shown) of the vehicle.

The metallic V-belt mechanism 10 comprises a drive pulley 11 mounted on the input shaft 1, a driven pulley 16 mounted on the countershaft 2, and a metallic V-belt 15 trained around the drive and driven pulleys 11,16.

The drive pulley 11 comprises an axially fixed pulley member 12 rotatably mounted on the input shaft 1, and a movable pulley member 13 axially movable relatively to the fixed pulley member 12. The movable pulley member 13 has a cylinder chamber 14 defined axially laterally thereof by a cylinder wall 12a coupled to the axially fixed pulley member 12. When a hydraulic pressure (a pulley thrust pressure) is supplied to the cylinder chamber 14, it generates a lateral (thrust) force for moving the movable pulley member 13 axially toward the fixed pulley member 12.

The driven pulley 16 comprises a fixed pulley member 17 fixedly mounted on the countershaft 2, and a movable pulley member 18 axially movable relatively to the fixed pulley member 17. The movable pulley member 18 has a cylinder chamber 19 defined axially laterally thereof by a cylinder wall 17a coupled to the fixed pulley member 17. When a hydraulic pressure (a pulley thrust pressure) is supplied to the cylinder chamber 19, it generates a lateral (thrust) force for moving the movable pulley member 18 axially toward the fixed pulley member 17.

Control of the hydraulic pressures (the pulley thrust pressures) supplied to the cylinder chambers 14,19 controls the thrust forces applied to the V-belt 15 so as not to allow slippage thereof. The control of the pulley control hydraulic pressures also controls the pulley widths of the pulleys 11,16 to change the diameters of the circles around which the V-belt 15 is trained on the pulleys 11,16 for continuously varying the speed ratio of the CVT.

The planetary-gear forward-reverse selector mechanism 20 comprises a sun gear 21 coaxially coupled to the input shaft 1, a carrier 22 coupled to the fixed pulley member 12, a ring gear 23 that can be held against rotation by a reverse brake 27, and a forward clutch 25 capable of connecting the sun gear 21 and the carrier 22 to each other. When the forward clutch 25 is engaged and the reverse brake 27 is disengaged, the sun gear 21, the planet gears on the carrier 22, and the ring gear 23 rotate in unison with the input shaft 1, causing the drive pulley 11 to rotate in the same direction as the input shaft 1 (forward direction). When the reverse brake 27 is engaged and the forward clutch 25 is disengaged, the ring gear 23 is held against rotation, and hence the carrier 22 is rotated in a direction opposite to the sun gear 21, so that the drive pulley 11 rotates in a direction opposite to the input shaft 1 (reverse direction).

The starting clutch 5 serves to allow the power to be transmitted from, or to prevent the power from being transmitted from, the countershaft 2 to the output member. When the starting clutch 5 is engaged, it connects the countershaft 2 to the output member, allowing the power to be transmitted from the countershaft 2 to the output member. Therefore, when the starting clutch 5 is engaged, the output power of the engine ENG is transmitted, at a speed ratio determined by the metallic V-belt mechanism 10, from the countershaft 2 through meshing gears 6a,6b,7a,7b to the differential mechanism 8, from which it is divided and transmitted to the right and left wheels. When the starting clutch 5 is disengaged, no such engine output power can be transmitted, and hence the transmission is held in a neutral condition.

The operation of the starting clutch 5 is controlled by a clutch control valve 75 in response to control signals from a controller 70. The clutch control valve 75 regulates the hydraulic pressure supplied to the starting clutch 5 through hydraulic passages 31a,31b to control the operation of the starting clutch 5.

Electric signals corresponding to the engine rotational speed Ne and the engine intake vacuum pressure PB are sent from an engine control unit ECU to the controller 70. The engine is operationally controlled by the engine control unit ECU. A detection signal from an air-conditioner sensor 65 which detects whether an air-conditioner AC is operated or not is also sent to the controller 70. Further, a shift-range position signal from a shift-range detector 66 which detects the shift-range based on the position ATP of a manual shift lever (or the position of a spool of a manual valve), not shown, is sent to the controller 70. Further, electric signals corresponding to the rotational speeds of the drive pulley 11, the driven pulley 16 and the gear 6a which are respectively detected by a first to third sensor 61,62,63 are sent to the controller 70.

The hydraulic pressures (the pulley thrust pressures) supplied to the drive and driven cylinders 14,19 through hydraulic passages 39a,39b are controlled by a pulley thrust pressure control valve 40 and a shift control valve 50 based on control signals from the controller 70.

Figure 2:
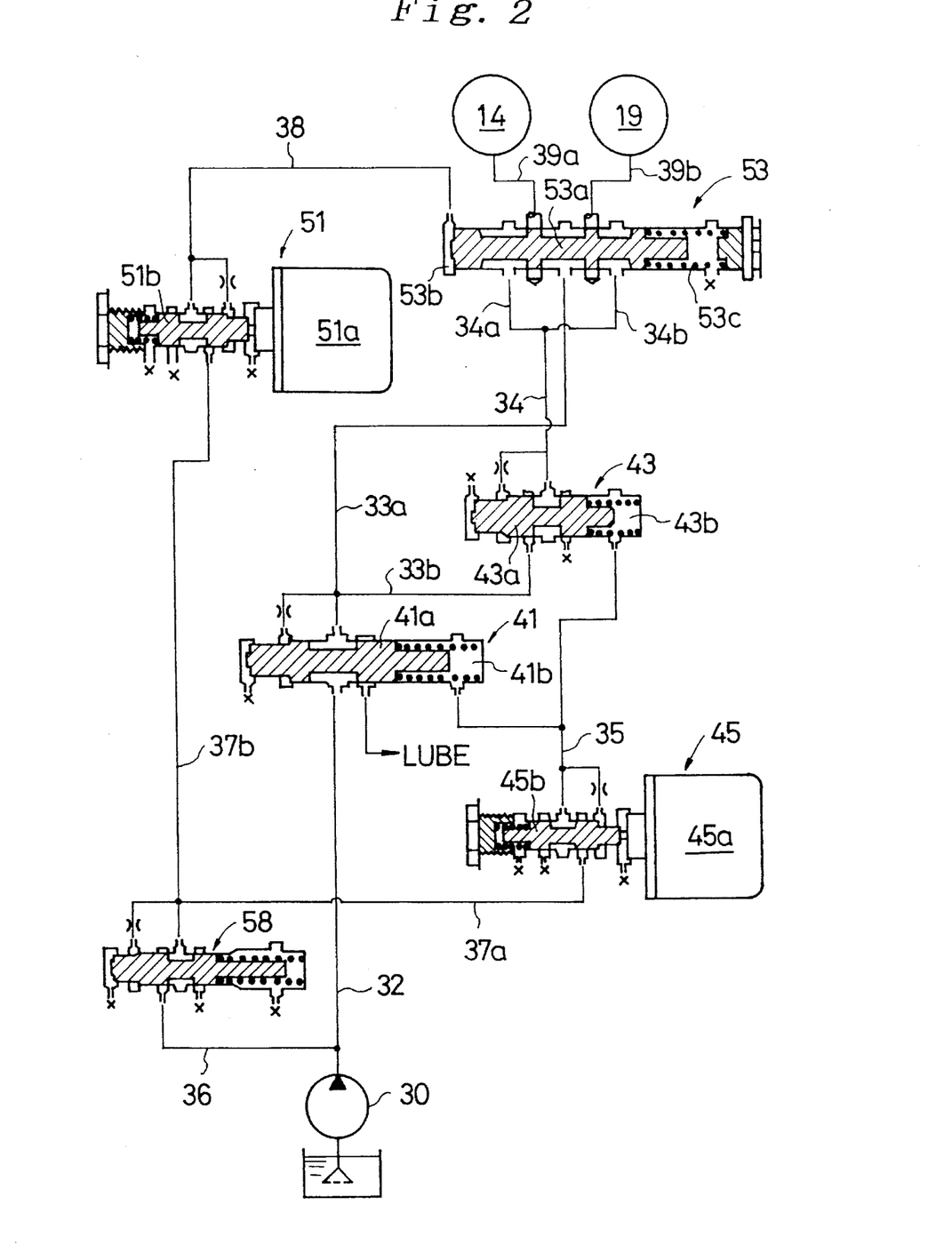
FIG. 2 is a hydraulic circuit diagram of the pulley thrust pressure control apparatus.

The pulley thrust pressure control valve 40 and the shift control valve 50 are shown in detail FIG. 2. The pulley thrust pressure control valve 40 comprises a high pressure regulator valve 41, a low pressure regulator valve 43, and a high/low pressure control valve 45. The shift control valve 50 comprises a shift control valve 51 and a shift valve 53.

The hydraulic circuit shown in FIG. 2 is described hereinafter. The mark "X" in FIG. 2 indicates that the marked portion is connected with a drain.

The working oil from a hydraulic pump 30 is supplied to a high pressure regulator valve 41 through a hydraulic passage 32, and also supplied to a reducing valve 58 through a hydraulic passage 36. The reducing valve 58 produces a line pressure $P_{MOD}$ having a substantially constant pressure. The working oil under the line pressure $P_{MOD}$ is supplied to the high/low pressure control valve 45 and the shift control valve 51 through hydraulic passages 37a,37b.

The high/low pressure control valve 45 includes a linear solenoid 45a. The exciting current control of the linear solenoid 45a serves to control a biasing force applied to a spool 45b. As a result, the line pressure $P_{MOD}$ is converted in the high/low pressure control valve 45 to a control back-pressure $P_{HLC}$ which corresponds to the biasing force. Then, the control back-pressure $P_{HLC}$ is supplied through a hydraulic passage 35 to right-end chambers 41b,43b thereof of the high and low pressure regulator valves 41,43 to push spools 41a, 43a thereof to the left.

When the control back-pressure $P_{HLC}$ is supplied to the high pressure regulator valve 41, the valve 41 regulates the hydraulic pressure of oil supplied from the pump 30 through the hydraulic passage 32 in correspondence with the control back-pressure $P_{HLC}$ to convert it to a high pulley thrust pressure PH. The high pulley thrust pressure PH is supplied to the shift valve 53 through a hydraulic passage 33a, and also supplied to the low pressure regulator valve 43 through a hydraulic passage 33b.

When the control back-pressure $P_{HLC}$ is supplied to the low pressure regulator valve 43, the valve 43 regulates the high pulley thrust pressure PH in correspondence with the control back-pressure $P_{HLC}$ to convert it to a low pulley thrust pressure PL. Therefore, the low pulley thrust pressure PL is lower in pressure than the high pulley thrust pressure PH. The low pulley thrust pressure PL is supplied to the shift valve 53 through hydraulic passages 34a,34b which is branched from the passage 34.

The shift control valve 51 includes a linear solenoid 51a. The control of the exciting current through the linear solenoid 51a serves to control a biasing force applied to a spool 51b of the shift control valve 51. As a result, the line pressure $P_{MOD}$ is converted in the shift control valve 51 to a shift control pressure $P_{SV}$ which corresponds to the biasing force. Then, the shift control pressure $P_{SV}$ is supplied to a left-end chamber 53b of the shift valve 53 through a hydraulic passage 38 to push a spool 53a to the right.

Since the spool 53a is being pushed to the left by a spring 53c, the spool 53a is moved to a position at which the biasing forces of the spring 53c and the shift control pressure $P_{SV}$ in the chamber 53b balances with each other. Accordingly, the control of the shift control pressure $P_{SV}$ by the shift control valve 51 enables a position control of the spool 53a of the shift valve 53. The high and low pulley thrust pressures PH and PL are distributed by shift valve 53 to the drive and driven cylinder chambers 14,19 through hydraulic passages 39a and 39b to control the speed ratio.

While controlling the speed ratio, the low pulley thrust pressure PL is set so as to be appropriate for enabling the torque transmission from the engine without allowing any slippage in the V-belt. The low pulley thrust pressure control carried out by the controller 70 is described hereinafter referring FIGS. 3,4 and 5.

Figure 3:
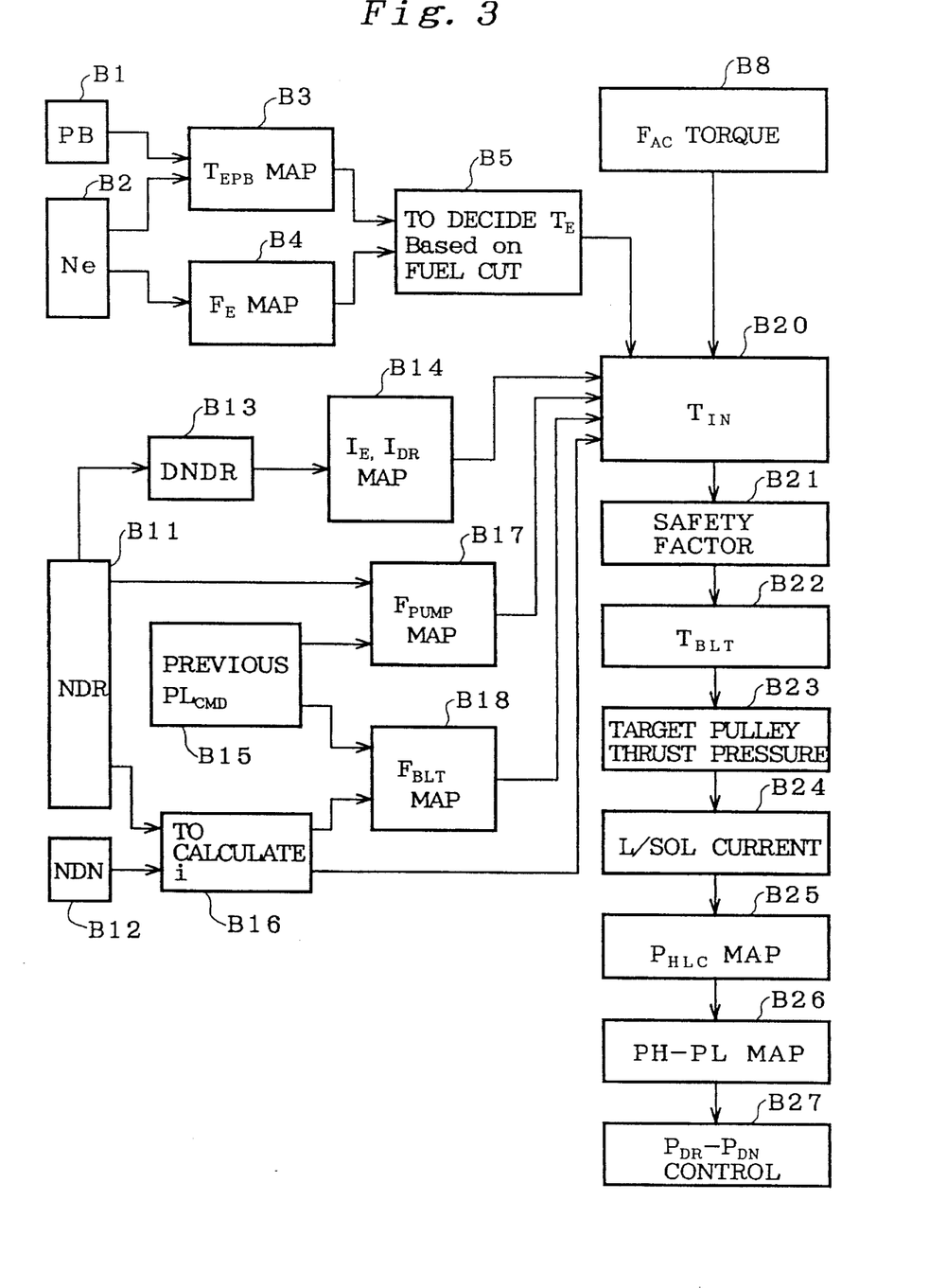
FIG. 3 is a block diagram of the pulley thrust force pressure control system.
Figure 4:
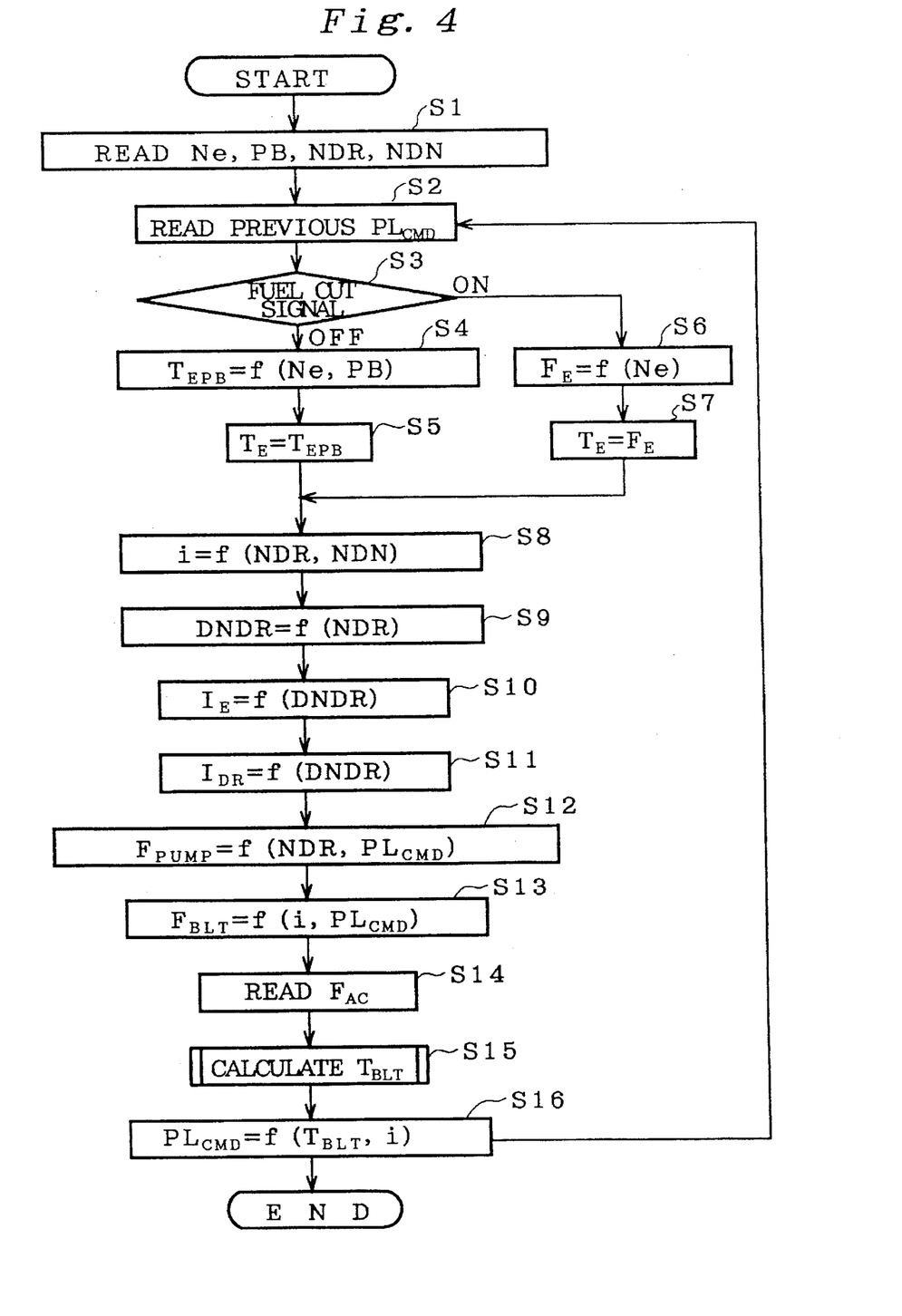
FIGS. 4 and 5 are flow-charts showing a control by the pulley thrust force control system.

As shown in FIGS. 3 and 4, the engine rotational speed Ne, the engine intake vacuum pressure $P_B$, the drive pulley rotational speed NDR and the driven pulley rotational speed NDN are detected first (see Step S1 in FIG. 4, Blocks B1,B2,B11,B12 in FIG. 3). As shown in FIG. 1, the engine speed Ne and the intake vacuum pressure $P_B$ are detected by the electric control unit ECU to control the engine operation. These detected values are sent from ECU to the controller 70.

Figure 5:
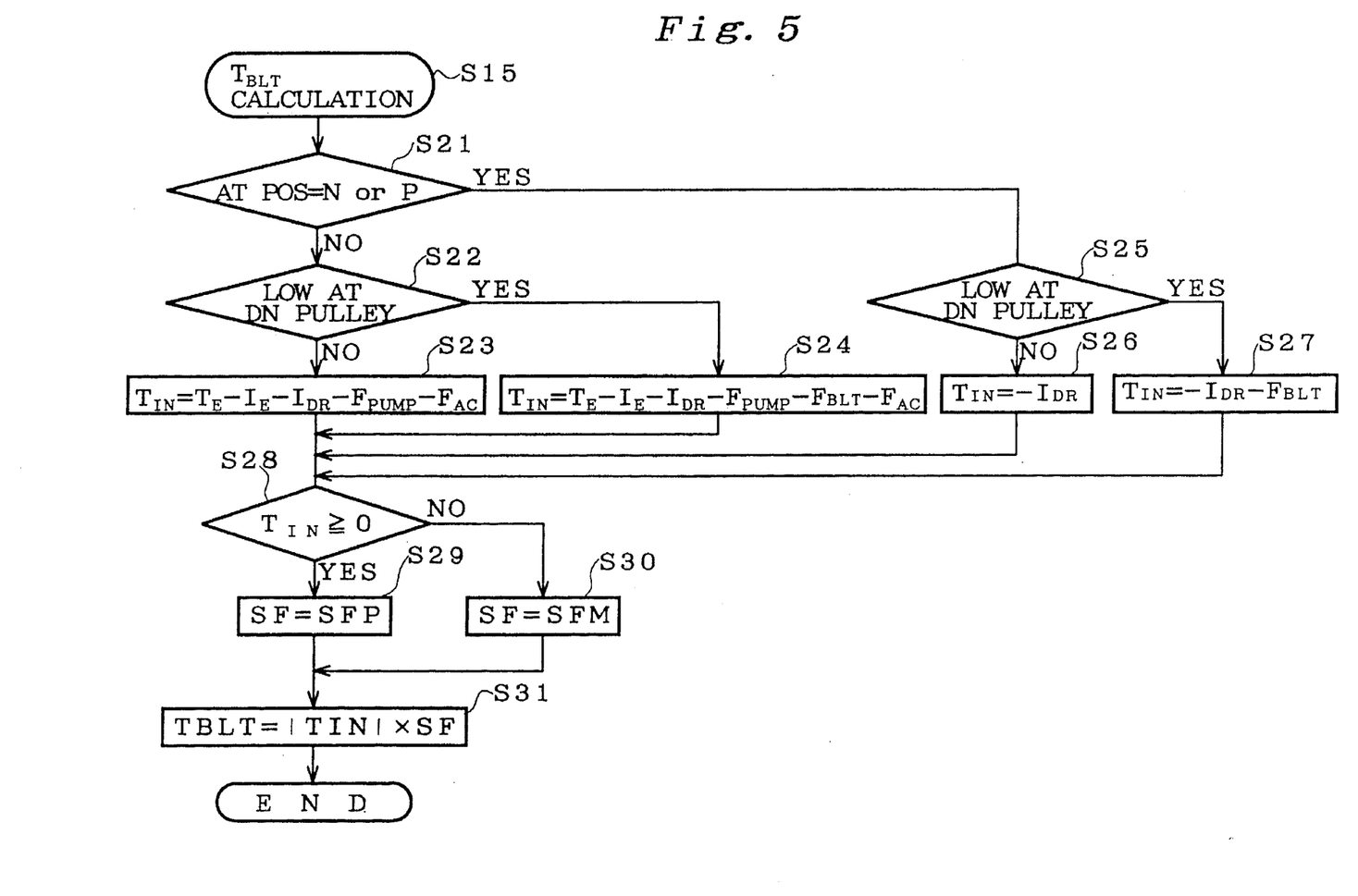

The control steps flow shown in FIGS. 4 and 5 is repeated in specified intervals. The low pulley thrust pressure $PL_{CMD}$ which was set in a previous flow is read at Step S2. Then, the engine output torque $T_E$ is calculated at Steps S4 to S7, with the calculation flow path being divided to two alternate flows based on fuel-cut control.

Figure 6:
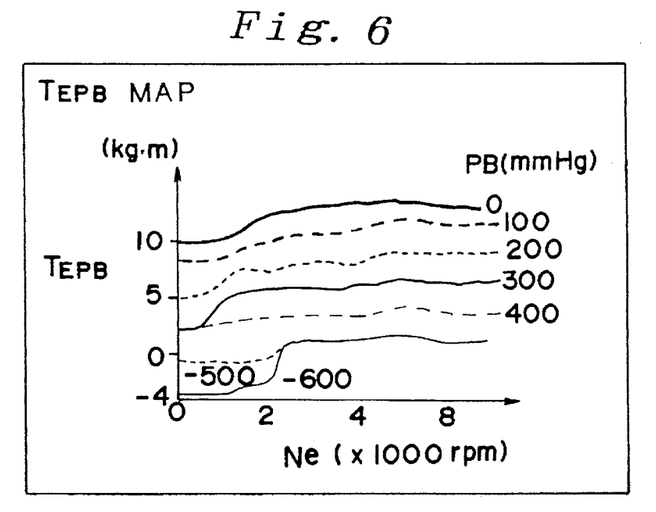
FIG. 6 is a graph showing an engine drive torque map.

When the fuel-cut control is not introduced, as determined at Step S3, an engine drive torque $T_{EPB}$ corresponding to the engine speed Ne and the intake vacuum pressure $P_B$ which were read at Step S1 is calculated by referring a engine drive torque map shown in FIG. 6 (Steps S4,S5 and Blocks B3,B5). The engine drive torque $T_{EPB}$ is set as a present engine output torque $T_E$.

Figure 7:
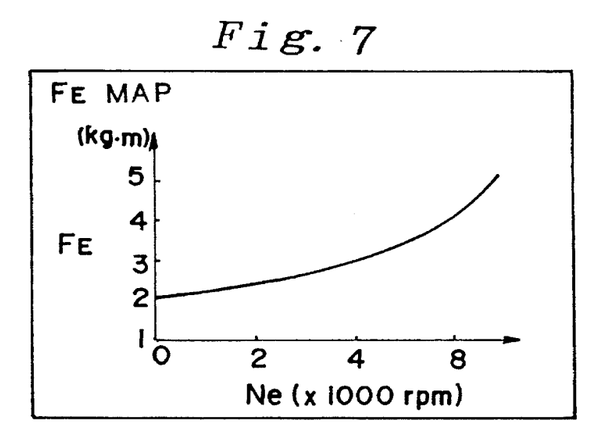
FIG. 7 is a graph showing an engine friction torque (engine braking torque) map.

Alternatively, when the fuel-cut control is carried out, as determined at Step S3, an engine friction torque (engine braking torque) $F_E$ corresponding to the present engine speed Ne is read from an engine friction torque map shown in FIG. 7 (Steps S6,S7 and Blocks B4,B5). The engine friction torque $F_E$ is a negative torque resulting from engine braking during deceleration of the vehicle.

Figure 9:
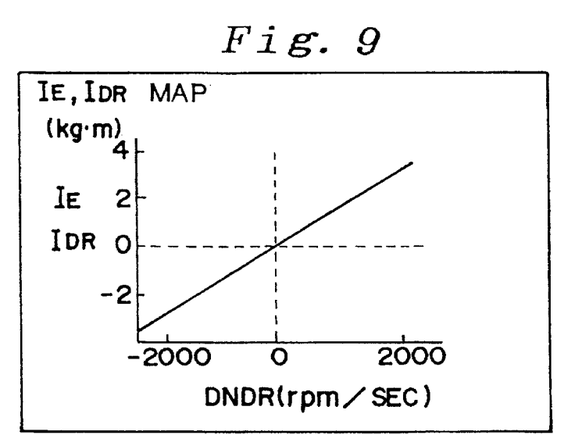
FIG. 9 is a graph showing an inertia torque map.

Then, the speed ratio i(=NDR/NDN) between the drive and the driven pulleys is calculated from the rotational speeds NDR,NDN of these pulleys (Step S8 and Block B16). A rate of change $D_{NDR}$ in the drive pulley rotational speed NDR is calculated (Step S9 and Block B13) from a difference between the previous drive pulley speed detected in the previous flow and the present drive pulley speed. Based on the rate of change $D_{NDR}$, the inertia torque $I_E$ required in the engine side inertia mass to vary the engine speed at the rate of the change $D_{NDR}$ is calculated (Step S10 and Block 14). Also, the inertia torque $I_{DR}$ required in the drive pulley side inertia mass to vary the drive pulley speed at the rate of the change $D_{NDR}$ is calculated (Step S11 and Block B14). The calculations are performed by referring to the inertia torque map shown in FIG. 9.

Figure 10:
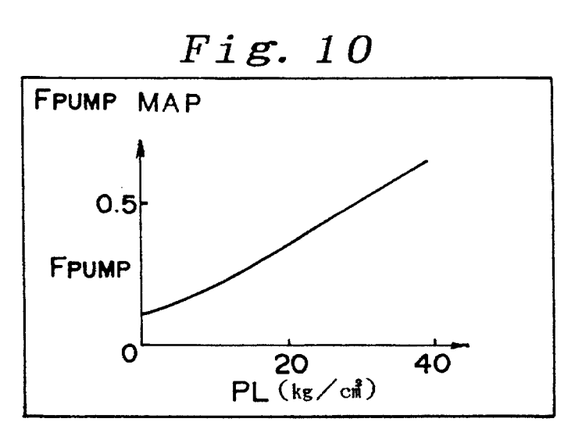
FIG. 10 is a graph showing a pump drive friction torque map.

A pump drive torque $F_{PUMP}$ required to drive the pump 30 is calculated based on the drive pulley rotational speed NDR and the low pulley thrust pressure $PL_{CMD}$ which was set at the previous flow (Step S12 and Block B17). The pump drive torque $F_{PUMP}$ is calculated by referring to the map shown in FIG. 10.

Figure 11:
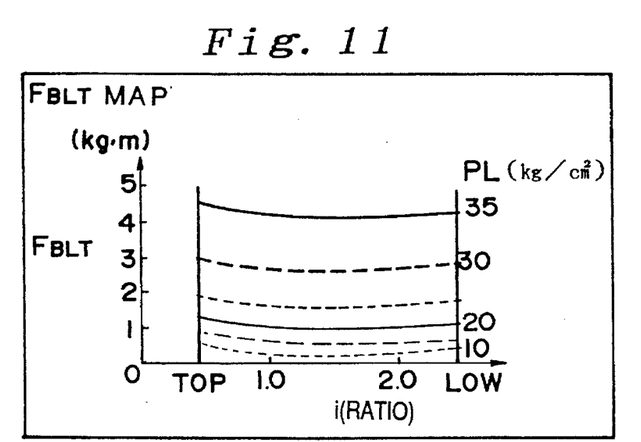
FIG. 11 is a graph showing a belt drive friction torque map.

Then a belt drive friction torque $F_{BLT}$ is calculated based on the speed ratio i and the low pulley thrust pressure $PL_{CMD}$ (Step S13 and Block B18). The belt drive friction torque is calculated referring the map shown in FIG. 11.

Figure 8:
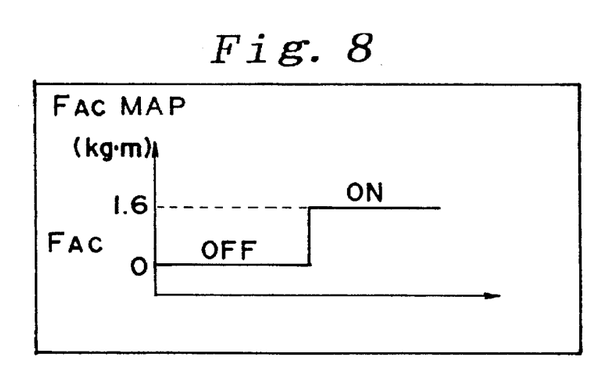
FIG. 8 is a graph showing an air-conditioner drive friction torque map.

An air-conditioner friction torque $F_{AC}$ is calculated based on a detection signal from the air-conditioner sensor 65 (Step S14 and Block B8). As shown in FIG. 8, when the air-conditioner is off, the air-conditioner friction torque $F_{AC}$ is zero. When it is on, a specified friction torque is needed to drive it.

Then a belt transmitting torque $T_{BLT}$ is calculated based on the above calculated values (Step S15 and Blocks B20–B22).

The calculation flow of the belt transmitting torque $T_{BLT}$ is set forth in detail in FIG. 5. At first, it is decided whether the shift range position detected by the shift range detector 66 is N-position or P-position at Step S21. If there is no detection signal from shift range detector 66, either the manual shift lever is in a driving shift position or the detector 66 has failed to send a signal whereby the response is NO in Step S21. If the shift range is not either N or P, it is judged whether the pressure in the driven cylinder chamber is low-side or not at Step S22. Namely, it is judged whether the driven cylinder pressure is lower than the drive cylinder pressure.

When the driven cylinder pressure is higher than the drive cylinder pressure, the belt drive friction torque $F_{BLT}$ can be ignored because the low pulley thrust pressure is calculated based on the drive pulley torque. An actual transmitting torque $T_{IN}$ transmitted from the drive pulley through the V-belt is calculated at Step S23 by the following equation:

$$T_{IN} = T_E - I_E - I_{DR} - F_{PUMP} - F_{AC}$$

When the driven cylinder pressure is lower than the drive cylinder pressure, the belt drive friction torque $F_{BLT}$ must be included in the actual transmitting torque calculation, because the low pulley thrust pressure is calculated based on the driven pulley torque. The actual transmitting torque $T_{IN}$ transmitted from the drive pulley through the V-belt is calculated at Step S24 by the following equation:

$$T_{IN} = T_E - I_E - I_{DR} - F_{PUMP} - F_{BLT} - F_{AC}$$

If the shift range position is N or P, it is decided whether the driven cylinder pressure is lower than the drive cylinder pressure at Step S25. At N or P-position, since the power transmission between the engine and the wheels is disconnected by the starting clutch 5, the actual transmitting torque $T_{IN}$ is determined based primarily on the inertia torque $I_{DR}$ in the drive pulley side.

When the driven cylinder pressure is higher than the drive cylinder pressure, as determined at Step S25, the belt drive friction torque $F_{BLT}$ can be ignored because the low pulley thrust pressure PL is supplied to the drive cylinder chamber 14. The actual transmitting torque $T_{IN}$ at the drive pulley is calculated by the following equation at Step S26.

$$T_{IN} = -I_{DR}$$

When the driven cylinder pressure is lower than the drive cylinder pressure, as determined at Step S25 the belt drive friction torque $F_{BLT}$ must be considered to calculate the actual transmitting torque $T_{IN}$ at the drive pulley because the low pulley thrust pressure PL is supplied to the drive cylinder chamber 14. The actual transmitting torque $T_{IN}$ at the drive pulley is calculated by the following equation at Step S27.

$$T_{IN} = -I_{DR} - F_{BLT}$$

After the actual transmitting torque $T_{IN}$ is calculated as described above at Steps S23–S27 (Block B20), it is judged whether the actual transmitting torque $T_{IN}$ is positive or negative at Step S28 (Block B21). When it is positive, the first safety factor SFP (>1.0) is set as a safety factor SF at Step S29. When it is negative, the second safety factor SFM (>SFP) is set as a safety factor SF at Step S30 (Block B21).

Then the actual transmitting torque $T_{IN}$ is multiplied by the safety factor SF to get a belt transmittable torque $T_{BLT}$ (Step S31, Block B22).

Since the safety factor SF is multiplied by a number larger than 1.0, the belt transmitting torque $T_{BLT}$ is larger than the actual transmitting torque $T_{IN}$ by the amount determined by the safety factor SF. Further, the second safety factor SFM which is set when the actual transmitting torque $T_{IN}$ is negative is larger than the first safety factor SFP which is set when the actual transmitting torque is positive. Accordingly, if the pulley thrust pressure is controlled based on the belt transmitting torque $T_{BLT}$, the belt thrust force control can be optimized even when the actual transmitting torque $T_{IN}$ is negative as well as positive.

Figure 12:
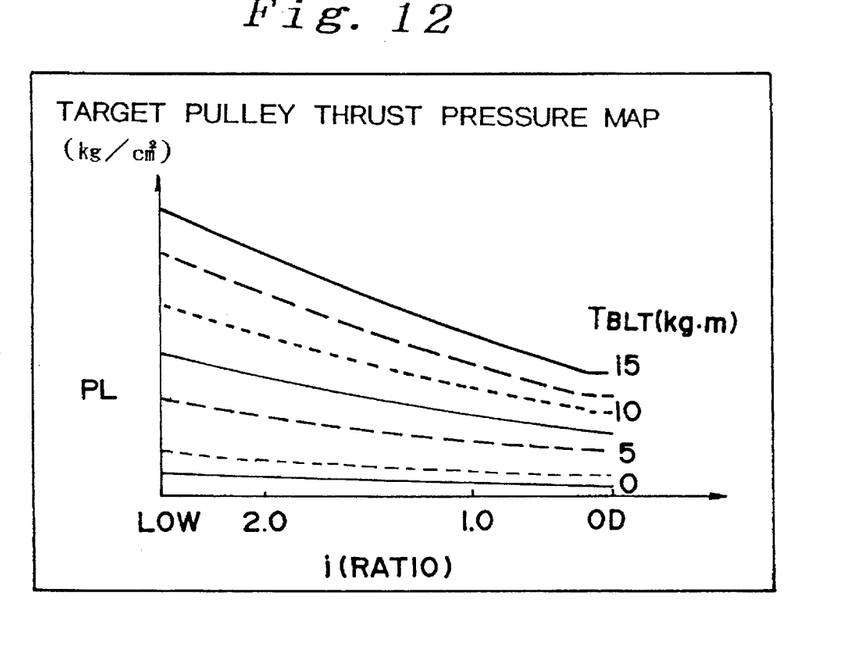
FIG. 12 is a graph showing a target low control pressure map.

After the belt transmitting torque $T_{BLT}$ is calculated as described above, the low pulley thrust pressure $PL_{CMD}$ is calculated in correspondence with the present speed ratio i and the belt transmitting torque $T_{BLT}$. The calculation is carried out by referring to the map shown in FIG. 12, which shows the relationship between the belt transmitting torque $T_{BLT}$ and the speed ratio i.

Figure 13:
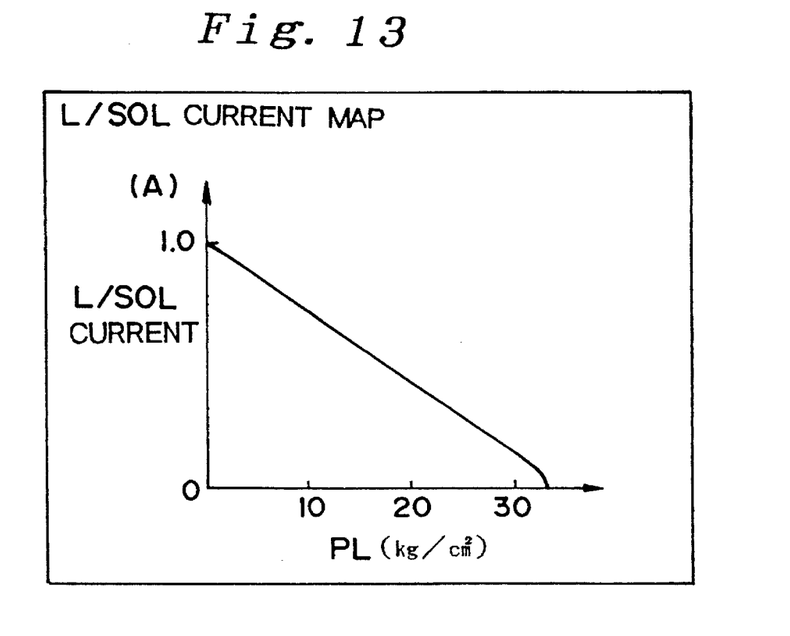
FIG. 13 is a graph showing the relationship between a low control pressure and a exciting current of a linear solenoid.
Figure 14:
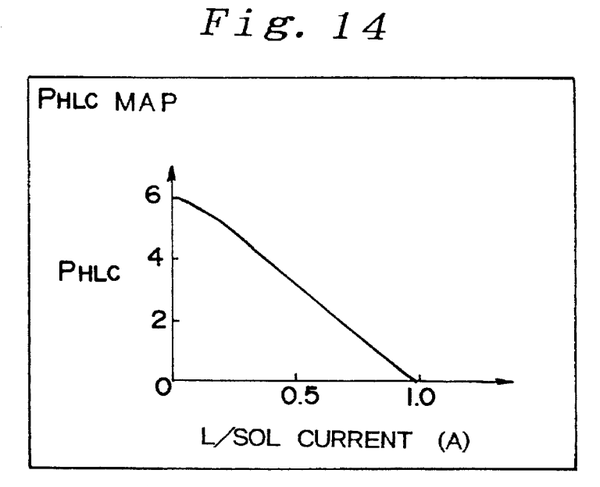
FIG. 14 is a graph showing the relationship between the exciting current of the linear solenoid and a control back-pressure.
Figure 15:
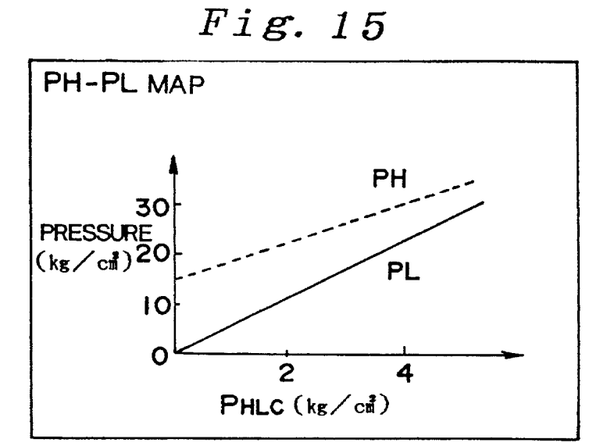
FIG. 15 is a graph showing the relationship between the control back-pressure and the low control pressure.

Then the low pulley thrust pressure $PL_{CMD}$ is generated by the low pressure regulator valve 43. As shown in FIG. 2, the pressure regulation by the high and low pressure regulator valves 41,43 is controlled by the high/low pressure control valve 45. Accordingly, the exciting current control of the linear solenoid 45a of the high/low pressure control valve 45 is carried out by referring to the maps shown in FIGS. 13, 14 and 15 to control the high and low pressure regulator valves 41,43. In these three figures, the relationship between the exciting current A through the linear solenoid 45a and the low pulley thrust pressure $PL_{CMD}$, the relationship between the exciting current A through the linear solenoid 45a and the control back-pressure $P_{HLC}$ generated by the high/low pressure control valve 45, and the relationship between the control back-pressure $P_{HLC}$ and the high and low pulley thrust pressures PH,PL, respectively, are shown.

Figure 16:
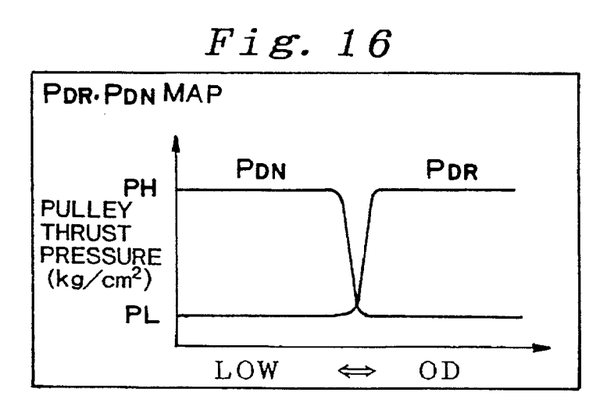
FIG. 16 is a graph showing characteristics of the pressures in the drive and driven cylinders.

Then these high and low pulley thrust pressures PH,PL are distributed to the drive and driven cylinder chambers 14,19 by the shift valve 53 as shown in FIG. 16 to control the speed ratio.

What is claimed is:

1. A pulley thrust pressure control apparatus for a belt-type continuously variable transmission having a drive pulley connected with an input member, a driven pulley connected with an output member, a V-belt passing around and engaging said drive and driven pulleys, a drive cylinder for varying a pulley thrust pressure applied to and a width of said drive pulley, and a driven cylinder for varying a pulley thrust pressure applied to and a width of said driven pulley, comprising:

actual transmitting torque calculation means for calculating an actual transmitting torque transmitted through said V-belt;

belt transmitting torque calculation means for calculating a belt transmitting torque by multiplying said actual transmitting torque by a safety factor;

a pulley thrust pressure control valve for controlling pulley thrust pressures supplied to said drive and driven cylinders based on at least said belt transmitting torque so as to obtain said belt transmitting torque in said belt-type continuously variable transmission; and said safety factor being set so as to be higher when said actual transmitting torque is negative than when it is positive.

2. A pulley thrust pressure control apparatus for a belt-type continuously variable transmission having a drive pulley connected with a drive power source, a driven pulley connected with an output member, a V-belt passing around and engaging said drive and driven pulleys, a drive cylinder for varying a pulley thrust pressure applied to and a width of said driven pulley a driven cylinder for varying a pulley thrust pressure applied to and a width of said driven pulley, and clutch means for connecting and disconnecting a power transmission path between said drive power source and said output member, comprising:

belt transmittable torque calculation means for calculating a belt transmittable torque through said V-belt;

a pulley thrust pressure control valve for controlling pulley thrust pressures supplied to said drive and driven cylinders based on at least said belt transmittable torque;

said belt transmittable torque being calculating by said belt transmittable torque calculation means based on at least a drive torque from said drive power source when said power transmission path is connected by said clutch means; and said belt transmittable torque being calculated by said belt transmittable torque calculation means based on at least an inertia torque in the drive pulley side inertia mass when said power transmission path is disconnected by said clutch means.

3. A pulley thrust pressure control apparatus for a belt-type continuously variable transmission according to claim 2; wherein:

when said power transmission path is disconnected by said clutch means, said belt transmittable torque is calculated based on only the inertia torque in the drive pulley side inertia mass when the pressure in said drive cylinder is lower than the pressure in said driven cylinder; and said belt transmittable torque is calculated based on the inertia torque in the drive cylinder side inertia mass and a belt drive friction torque when the pressure in said driven cylinder is lower than the pressure in said drive cylinder.

4. A pulley thrust pressure control apparatus for a belt-type continuously variable transmission having a drive pulley connected with a drive power source, a driven pulley connected with an output member, a V-belt passing around and engaging said drive and driven pulleys, a drive cylinder for varying a pulley thrust pressure applied to and a width of said drive pulley, and a driven cylinder for varying a pulley thrust pressure applied to and a width of said driven pulley, comprising:

belt transmittable torque calculation means for calculating a belt transmittable torque through said V-belt;

a pulley thrust pressure control valve for controlling pulley thrust pressures supplied to said drive and driven cylinders based on at least said belt transmittable torque;

shift position detecting means for detecting a present shift position;

said belt transmittable torque being calculated by said belt transmittable torque calculation means based on at least a drive torque transmitted from said drive power source when it is detected by said shift position detecting means that one of the driving shift positions is selected; and said belt transmittable torque being calculated by said belt transmittable torque calculation means based on at least the drive torque transmitted from said drive power source even when no detection signal is sent from said shift position detecting means.

5. A pulley thrust pressure control apparatus for a belt-type continuously variable transmission according to claim 4; wherein:

said belt transmittable torque being calculated by said belt transmittable torque calculation means based on at least a inertia torque in the drive pulley side inertia mass when it is detected by said shift position detecting means that a neutral position is selected.

6. A pulley thrust pressure control apparatus for a belt-type continuously variable transmission having a drive pulley connected with an input member, a driven pulley connected with an output member, a V-belt passing around and engaging said drive and driven pulleys, a drive cylinder for varying a pulley thrust pressure applied to and a width of said drive pulley, and a driven cylinder for varying a pulley thrust pressure applied to and a width of said driven pulley, comprising:

a shift control valve for supplying a pressure to and discharging a pressure from said drive and driven cylinders;

controlling means for controlling the operations of said shift control valve;

belt transmittable torque calculation means for calculating a belt transmittable torque through said V-belt based on an engine output torque which drives said input member and a speed ratio between said input member and said output member;

transmittable torque correction means for correcting said belt transmittable torque based on a belt drive friction torque in said V-belt when it is decided by said controlling means that the pressure in said driven cylinder is lower than the pressure in said drive cylinder; and said shift control valve being controlled by said controlling means so as to obtain the thrust pressures in said drive and driver pulleys to produce said corrected belt transmittable torque.

7. A pulley thrust pressure control apparatus for a belt-type continuously variable transmission according to claim 6, wherein said controlling means comprises a solenoid valve; and a judging means for judging, based on an exciting current through a solenoid of said solenoid valve, whether the pressure is lower in said driven cylinder than in said drive cylinder.

8. A pulley thrust pressure control apparatus for a belt-type continuously variable transmission having a drive pulley connected with a power source, drive pulley connected with an output member, a V-belt passing around and engaging said drive and driven pulleys, a drive cylinder for varying a pulley thrust pressure applied to and a width of said drive pulley, and a driven cylinder for varying a pulley thrust pressure applied to and a width of said driven pulley, comprising:

actual transmitting torque calculation means for calculating an actual transmitting torque transmitted through said V-belt;

belt transmitting torque calculating means for calculating a belt transmitting torque by multiplying said actual transmitting torque by a safety factor, said safety factor being set so as to be higher when said actual transmitting torque is negative than when it is positive, a pulley thrust pressure control valve for controlling pulley thrust pressures supplied to said drive and driven cylinders based on at least said belt transmitting torque so as to obtain the pulley thrust pressures required to produce said belt transmitting torque in said belt-type continuously variable transmission;

shift position detecting means for detecting a present shift position;

said belt transmitting torque being calculated by said belt transmitting torque calculation means based on at least a drive torque transmitted from said drive power source when it is detected by said shift position detecting means that one of the driving shift positions is selected; and said belt transmitting torque being calculated by said belt transmitting torque calculation means based on at least the drive torque transmitted from said drive power source even when no detection signal is sent from said shift position detecting means.

9. A pulley thrust pressure control apparatus for a belt-type continuously variable transmission according to claim 8, wherein:

said belt transmitting torque being calculated by said belt transmitting torque calculation means based on at least a inertia torque in the drive pulley side inertia mass when it is detected by said shift position detecting means that a neutral position is selected.

10. A pulley thrust pressure control apparatus for a belt-type continuously variable transmission according to claim 8; wherein there is further provided:

a shift control valve for supplying a pressure to and discharging a pressure from said drive and driven cylinders;

controlling means for controlling the operations of said shift control valve;

transmitting torque correction means for correcting said belt transmitting torque based on at least a belt drive friction torque in said V-belt when it is decided that the pressure in said driven cylinder is lower than the pressure in said drive cylinder; and said shift control valve being controlled by said controlling means so as to obtain the pulley thrust pressures required to produce said corrected belt transmitting torque.

11. A pulley thrust pressure control apparatus for a belt-type continuously variable transmission having a drive pulley connected with a power source, a driven pulley connected with an output member, a V-belt passing around and engaging said drive and driven pulleys, a drive cylinder for varying a pulley thrust pressure applied to and a width of said drive pulley, and clutch means for connecting and disconnecting a power transmission path between said power source and said output member, comprising:

actual transmitting torque calculation means for calculating an actual transmitting torque transmitted through said V-belt;

belt transmittable torque calculation means for calculating a belt transmittable torque by multiplying said actual transmitting torque by a safety factor;

a pulley thrust pressure control valve for controlling pulley thrust pressures supplied to said drive and driven cylinders based on at least said belt transmittable torque so as to obtains the pulley thrust pressures required to produce said belt transmittable torque in said belt-type continuously variable transmission;

said belt transmittable torque being calculated by said belt transmittable torque calculation means based on at least an inertia torque in the drive pulleys side inertia mass when said power transmission path is disconnected by said clutch means.

12. A pulley thrust pressure control apparatus for a belt-type continuously variable transmission according to claim 11; wherein:

in the case that said power transmission path is disconnected by said clutch means, said belt transmittable torque is calculated based on only the inertia torque in the drive pulley side inertia mass when the pressure in said drive cylinder is lower than the pressure in said driven cylinder; and said belt transmittable torque is calculated based on the inertia torque in the drive cylinder side inertia mass and a belt drive friction torque when the pressure in said driven cylinder is lower than the pressure in said drive cylinder.

13. A pulley thrust pressure control apparatus for a belt-type continuously variable transmission having a drive according to claim 11; wherein there is provided:

a shift position detecting means for detecting a present shift position;

said belt transmittable torque being calculated by said belt transmittable torque calculation means based on a torque transmitted from said power source when it is detected by said shift position detecting means that one of the driving shift positions is selected; and said belt transmittable torque being calculated by said belt transmittable torque calculation means based on the torque transmitted from said drive power source even when no detection signal is sent from said shift position detecting means.

14. A pulley thrust pressure control apparatus for a belt-type continuously variable transmission according to claim 13; wherein:

said belt transmittable torque being calculated by said belt transmittable torque calculation means based on at least a inertia torque in the drive pulley side inertia mass when it is detected by said shift position detecting means that a neutral position is selected.

15. A pulley thrust pressure control apparatus for a belt-type continuously variable transmission having a drive according to claim 11; wherein there is provided:

a shift control valve for supplying a pressure to and discharging a pressure from said drive and driven cylinders;

controlling means for controlling the operations of said shift control valve;

a transmittable torque correction means for correcting said belt transmittable torque based on a belt drive friction torque in said V-belt when it is decided that the pressure in said driven cylinder is lower than the pressure in said drive cylinder; and said shift control valve being controlled by said controlling means so as to obtain said corrected belt transmittable torque.

16. The pulley thrust pressure control apparatus of claim 1 wherein the controlling of the pulley thrust pressures supplied to said drive and driven cylinders by said pulley thrust pressure control valve also is based on an actual speed ratio between said drive and driven pulleys.

17. The pulley thrust pressure control apparatus of claim 2 wherein the controlling of the pulley thrust pressures supplied to said drive and driven cylinders by said pulley thrust pressure control valve also is based on an actual speed ratio between said drive and driven pulleys.

18. The pulley thrust pressure control apparatus of claim 4 wherein the controlling of the pulley thrust pressures supplied to said drive and driven cylinders by said pulley thrust pressure control valve also is based on an actual speed ratio between said drive and driven pulleys.

19. The pulley thrust pressure control apparatus of claim 8 wherein the controlling of the pulley thrust pressures supplied to said drive and driven cylinders by said pulley thrust pressure control valve also is based on an actual speed ratio between said drive and driven pulleys.

20. The pulley thrust pressure control apparatus of claim 11 wherein the controlling of the pulley thrust pressures supplied to said drive and driven cylinders by said pulley thrust pressure control valve also is based on an actual speed ratio between said drive and driven pulleys.

\* \* \* \* \*